United States Patent [19]

Fuhrman

[11] Patent Number: 4,791,753
[45] Date of Patent: Dec. 20, 1988

[54] ANIMAL CAPTURING APPARATUS

[76] Inventor: Richard C. Fuhrman, 1212 W. Flamingo, Seabrook, Tex. 77586

[21] Appl. No.: 101,743

[22] Filed: Sep. 28, 1987

[51] Int. Cl.⁴ .............................................. A01M 23/02
[52] U.S. Cl. ............................................ 43/63; 43/88
[58] Field of Search ................................. 43/63, 60, 88

[56] References Cited

U.S. PATENT DOCUMENTS

| | | | |
|---|---|---|---|
| 102,761 | 5/1870 | Brooks | 43/63 |
| 234,004 | 11/1880 | Dolley | 43/63 |
| 433,241 | 7/1890 | Hawkins | 43/63 |
| 1,612,608 | 12/1926 | Chamberlin | 43/63 |
| 1,765,144 | 6/1930 | Gibbs | 43/63 |

FOREIGN PATENT DOCUMENTS 24645 of 1906 United Kingdom .................. 43/63

Primary Examiner—Nicholas P. Godici
Assistant Examiner—Karen Skillman
Attorney, Agent, or Firm—Bill B. Berryhill

[57] ABSTRACT

Apparatus for capturing birds and other animals may comprise: a pair of carrier poles the proximal ends of which may be anchored to the ground for pivoting from first parallel positions against the ground to second parallel positions against the ground. A semicylindrical net is provided one longitudinal edge of which is affixed along the ground and the other longitudinal edge of which is fixed between the distal ends of the carrier poles so that upon movement of the carrier poles from their first to their second positions the net is deployed in a semicylindrical configuration to envelope animals beneath the net.

5 Claims, 2 Drawing Sheets

ANIMAL CAPTURING APPARATUS

BACKGROUND OF THE INVENTION

1. Field of the Invention

The present invention pertains to animal capturing apparatus. In particular, the present invention pertains to net apparatus suitable for the capture of birds and other small animals without physical danger thereto.

2. Description of the Prior Art

There are many trap or capture devices for the capture of birds and small animals. In some of these devices, a net is stowed or folded near the ground or to one side of the trap and, upon deployment, is propelled over the animal or animals in the capture area to enclose the animals within the net. Examples of such traps may be seen in U.S. Pat. Nos. 102,761; 234,004; 433,241 and 1,612,608.

Several problems occur with such capturing devices. In some of the prior art devices, the leading edge of the net or capture device is very rigid and may result in injury to an animal if hit thereby. Many of these devices require activation by an animal tripping a trigger or mechanism for activation of the device. This is sometimes very difficult to achieve with wary animals. Furthermore, it may cause premature deployment when a plurality of animals are sought to be captured in a single operation.

Many of the mechanisms for propelling the nets of capture devices of the prior art are relatively noisey. In fact, some utilize rockets or mortars. Such devices frighten animals and may result in injury thereto. The propelling force required for large nets and multiple animal capture increases this problem. Thus, the search continues for quieter and more effective animal capturing devices.

SUMMARY OF THE PRESENT INVENTION

In the present invention, apparatus is disclosed for capturing animals which may comprise: first and second mounting plates adapted for anchoring to the ground; first and second elongated carrier poles the proximal ends of which are pivotially attached to the first and second mounting plates, respectively, and the distal ends of which are movable from first positions in which the carrier poles lie parallel to each other against the ground on one side of the mounting plates to second positions in which the carrier poles lie parallel to each other against the ground on opposite sides of the mounting plates. A semicylindrical net is provided, one longitudinal edge of which is affixed along the ground in a substantially straight line between distal ends of the carrier poles, when in their first positions, and the other longitudinal edge of which is connected between the distal ends of the carrier poles so that upon movement of the carrier poles from their first positions to their second positions, the net is moved from a stowed position along the ground, through deployment in a semicylindrical configuration, to envelope animals underneath the net. A propelling assembly is attached to the carrier poles for selectively propelling them between the first and second positions and may include first and second elastic cords attached to the first and second mounting plates and the first and second carrier poles. The elastic cords are placed in tension, when the carrier poles are in their first positions, biasing the carrier poles toward the second position.

The animal capturing device of the present invention is uniquely self propelled, quiet, fast closing, remotely operable and of low profile. Its semicylindrical net is stowed along the ground upon itself and when released is quickly propelled through a semicircular arc to a closed position where it collapses on the trapped animals.

The capture footprint of the apparatus of the present invention is carefully controlled to allow the maximum number of specimens to be caught at one time even in confined areas or under a forest canopy. Unlike rocket or mortar propelled nets, the propelling mechanism of the present invention is quiet and provides high loft, reducing the possibility of injury to animals. Unlike drop nets, the animals do not have to become accustomed to or be baited under a clearly overhanging net. The low profile of the capture apparatus of the present invention allows it to be easily camoufaged.

The capture apparatus of the invention is easily and quickly installed and set and may be easily and quickly reset after deployment. Many other objects and advantages of the invention will be understood from reading the description which follows in conjunction with the drawings.

DESCRIPTION OF A PREFERRED EMBODIMENT

Figure 1:
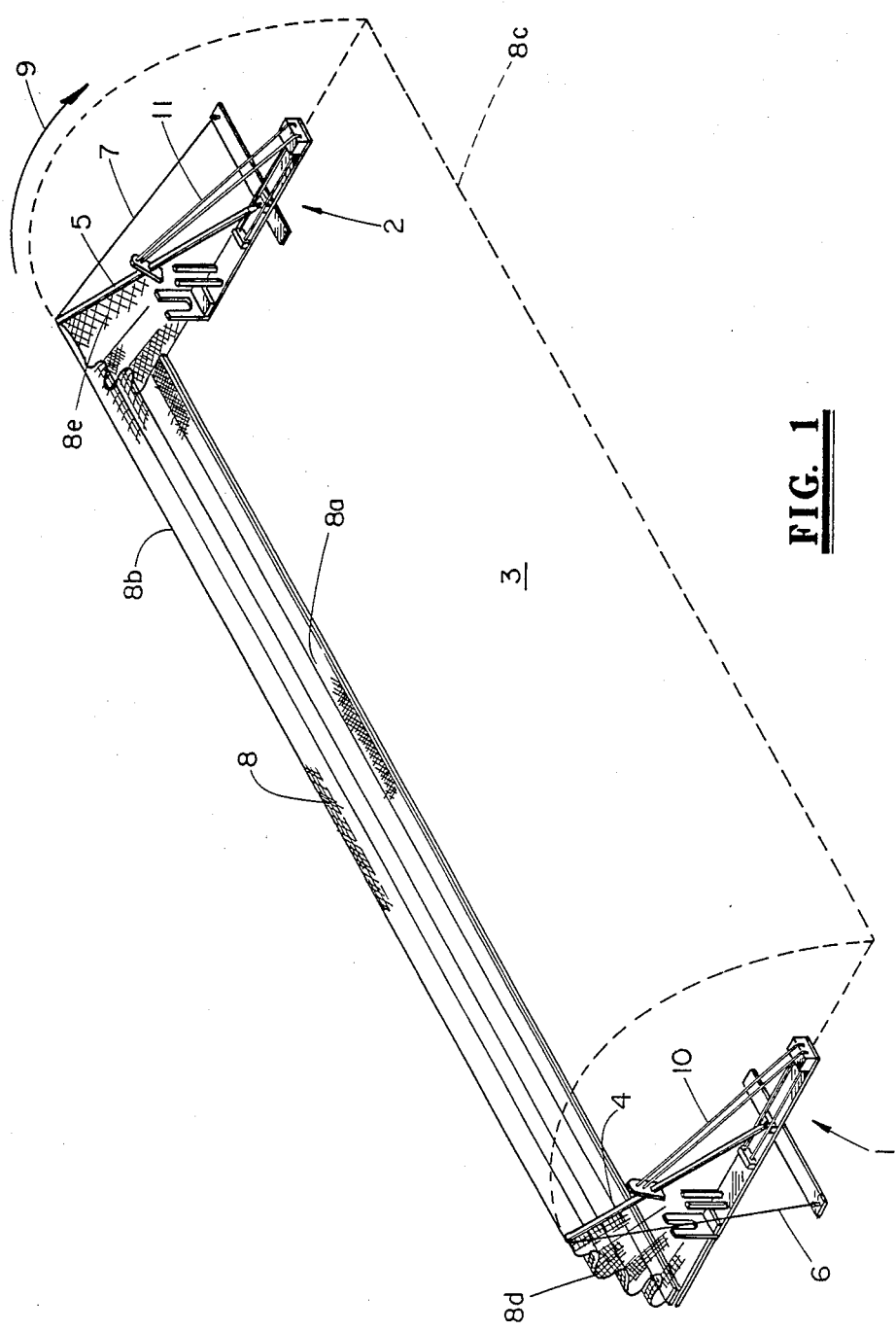
FIG. 1 is a pictorial representation of the capturing apparatus of the present invention, showing the apparatus generally after release and as the net thereof is being propelled in semicylindrical deployment.

Referring now to the drawings, FIGS. 1-4, the animal capturing apparatus of the present invention will be described. As shown in FIG. 1, the apparatus comprises first and second mounting plates 1, 2 adapted for anchoring to the ground 3 at preselected intervals. The mounting plates 1, 2 will be more fully described hereafter. First and second elongated carrier poles 4, 5 are pivotially attached, at the proximal ends thereof, to the first and second mounting plates 1, 2. The distal ends of the carrier poles 4, 5 are movable from first positions in which they lie parallel to each other against the ground on one side of the mounting plates 1, 2 to second positions in which the carrier poles lie parallel to each other on the ground on the opposite side of the mounting plates 1, 2. Guy lines 6, 7 extend from portions of the mounting plates 1, 2 to distal ends of the carrier poles 4, 5 to help maintain the poles 4, 5 in the position of the radius of a semicircle in their movement from first to second positions.

The apparatus includes a semicylindrical net 8, one longutudinal edge 8a of which is affixed along the ground 3 in a substantially straight line. The leading longitudinal edge 8b of the net 8 is fixed between the distal ends of the carrier poles 4, 5 so that upon movement of the carrier poles 4, 5 from their first positions toward the second position the net is propelled from a stowed position near the longutudinal edge 8a through an arc 9 for deployment in a semicylindrical configuration to envelop any birds are other animals which may be underneath the net 8 within the rectangular area 8c. The net 8 is closed at its ends by semicircular panels 8d and 8e. Although the net 8 is semicylindrical in shape, it will not stay in that shape but will collapse once it has been deployed. In so doing, the animals in the area 8c will be entrapped therein.

The capturing apparatus of the present invention includes means for selectively propelling the carrier poles 4, 5 between the first and second positions. In FIG. 1, the propelling means is only generally shown and is illustrated as including first and second elastic cords 10, 11 which are placed in tension when the carrier poles are in the first positions so as to bias the carrier poles toward their second positions. A preferred embodiment of the propelling means will be described hereafter.

Figure 2:
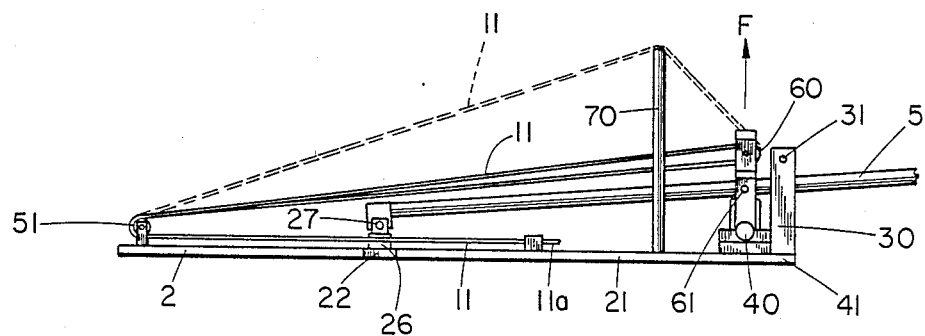
FIG. 2 is a side elevation view of portions of capturing apparatus of the present invention, with the net removed therefrom.
Figure 3:
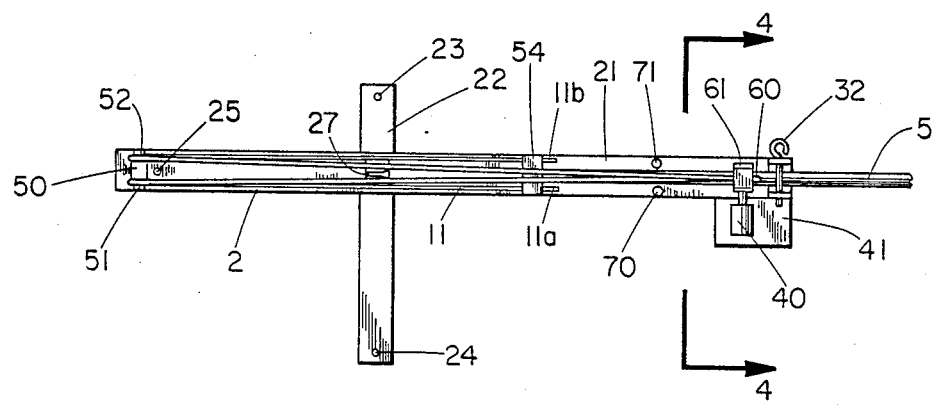
FIG. 3 is a top plan view of the portion of the apparatus shown in FIG. 2.
Figure 4:
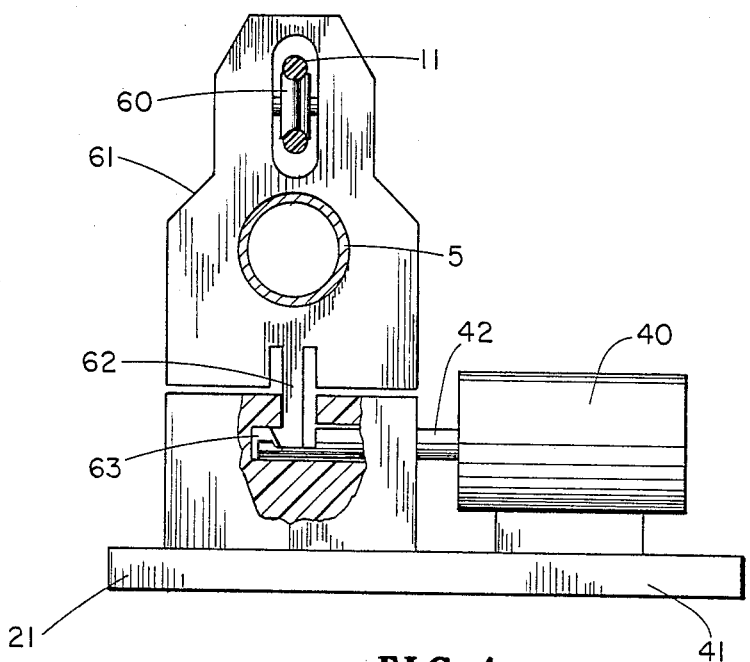
FIG. 4 is a cross-sectional view of a portion of the apparatus taken along lines 4—4 of FIG. 3.

Referring now for greater detail to FIGS. 2-4, a further explanation of portions of the apparatus of the present invention, particularly the propelling means, will be given. FIGS. 2-4 show the second mounting plate 2, the second carrier pole 5 and the components associated therewith. These components are illustrated without the net 8. It is easily understood that the components associated with first mounting plate 1 and carrier pole 4 would essentially be a mirror image of these components. The mounting plate 2 may comprise an elongated flat member 21 and a cross member 22 attached at right angles thereto. These members may be provided with holes 23, 24, 25, etc. through which spikes may be driven for anchoring the mounting plates against the ground.

Mounted on the plate 2 is pivot block 26 providing a pivot connection 27 by which the proximal end of the carrier pole 5 is pivotally attached thereto. This allows the carrier pole 5 to move from its first position, as illustrated in FIGS. 2-4, to its second position in which the distal end of the carrier pole 5 is on the opposite side of the mounting plate 2. It will be noted that the carrier pole 5, when in its first position, is cradled in a yoke member 30 which is attached to one end of the mounting plate member 21. The yoke 30 may be provided with holes 31 through which a safety pin 32 may be inserted to hold the carrier pole 5 in this position. Thus, the carrier pole 5 would not be allowed to move from its first position until the safety pin 32 were removed. Attached to the same end of the mounting plate member 21 as the yoke 30 and on a platform 41 provided therefor is a solenoid 40, the purpose of which will be more fully understood hereafter.

Mounted at the opposite end of the mounting plate member 21 is a dual pulley block 50 having pulleys 51 and 52 thereon. Attached to a retainer block 54 affixed to the plate member 21 are the ends 11a and 11b of an elastic cord member 11 generally illustrated in FIG. 1. From the end 11a the elastic member 11 runs around the pulley 51 to a pulley 60 attached by a pulley release block 61 to carrier pole 5. From the pulley 60 the elastic member 11 runs around pulley 52 and back to retainer block 54 for its termination at 11b. The elastic cord 11 in the positions of FIGS. 3 and 4 is placed in tension and as such, tends to bias or force the carrier pole 5 from its first position, as shown in FIGS. 2 and 3, to the second position previously described. Of course, as long as safety pin 32 is in place this is prevented.

An unusual feature of the present invention is the provision of a pair of lofting pins 70 and 71. These vertically extending pins or rods 70, 71 are attached to the mounting plate member 21 fairly near the pulley release block 61. If portions of the elastic cord 11 are placed on the ends of the lofting pins 70, 71, as illustrated by the dotted line illustration in FIG. 2, a substantial vertical force component F will be applied through the pulley 60 to the carrier pole 5 and if the carrier pole 5 is unrestrained, will assist in initiating the carrier pole 5 and the net (not shown) attached thereto from their first or stowed position to their second or deployed positions.

Thus, if the safety pin 32 were removed, the carrier pole 5 would tend to move from its first position. However, to prevent this from happening until desired, a release mechanism is provided which includes a release member 62 affixed to pulley release block 61. In its set position, the release member 62 engages a slot 63 in release retainer blocks 63. This holds the carrier pole 5 in its set first position. This release member 62 is biased toward engagement with the slot 63. However, it is attached to the shaft 42 of solenoid 40. Upon receiving a proper signal, the solenoid 40 retracts the shaft 42 to release the member 62 from slot 63 allowing the carrier pole 5 to be propelled under the forces exerted by the elastic cord 11 from its first position to its second position. In so moving, the net 8 (see FIG. 1) is moved through the arc 9 to its semicylindrical configuration. Although, the preferred embodiment is illustrated as being activated or released by a solenoid 40, this could be done manually by providing cables to a remote location whereupon a force applied to the cables would release the release member 62 from the slots 63.

Briefly described, the installation and operation of the capture apparatus of the present invention is as follows. The mounting plates 1 and 2 would be anchored to the ground at preselected spaced intervals. One longitudinal edge 8a of the net 8 would be affixed along the ground in a substantially straight line, the other longitudinal edge 8b of the net 8 being affixed to the distal ends of carrier poles 4 and 5. Guy lines 6, 7 would be in place to guide the movement of carrier poles 4, 5. The carrier poles 4, 5 would b moved to their first positions, as illustrated in FIGS. 2-4, and the net 8 stowed along the longitudinal edge 8a. The net could be hidden in a shallow trench or otherwise disguised.

It is understood that in the first position, the elastic cords 10 and 11 are under substantial tension and the carrier poles 4 and 5 are safely held in this position by the safety pin 32. In addition, the release member 62 engages slot 63 maintaining this position. In final preparation, the elastic cords 10 and 11 are elevated and placed on the ends of lofting pins (see 70, 71 in FIGS. 2 and 3) so that the substantial vertical force component F is applied. The safety pin 32 is removed and the capturing apparatus is ready for deployment.

The area 8c is then normally baited or supplied with feed attractive to the birds or animals being sought. When the birds or other animals enter the area 8c, the release mechanism may be remotely operated releasing the carrier poles 4, 5 and propelling them and the net 8 from first to second positions in which the net 8 is deployed in a semicylindrical configuration to envelope any birds or other animals in the area 8c beneath the net. Once movement of the carrier poles 4 and 5 is arrested, the net 8 automatically collapses on the captured birds or other animals.

It is thus seen that the capturing apparatus of the present invention is remotely operable with a minimum of noise and harm to the animals captured thereby. The only area of possible danger to an animal is in the arc traversed in the movement of carrier poles 4 and 5 from their first to their second positions. By carefully observing the animals in area 8c, the apparatus can be actuated when this limited area is free of animals.

The capturing apparatus of the present invention is extremely effective and efficient. The animals do not have to become accustomed to a visible net and the low profile of the apparatus allows easy coverage or camouflage. However, upon deployment, the net can actually be deployed over low brush or small trees. It is easily installed and operated and may be adjusted for various conditions of rain, wind, net weight, net shape and net air drag.

While a single embodiment of the invention has been described herein, many variations can be made without departing from the spirit of the invention. Accordingly, it is intended that the scope of the invention be limited only by the claims which follow.

I claim:

1. Apparatus for capturing birds and other animals comprising:

first and second mounting plates adapted for anchoring to the ground at preselected spaced intervals;

first and second elongated carrier poles the proximal ends of which are pivotially attached to said first and second mounting plates, respectively, and the distal ends of which are movable from first positions, in which said carrier poles lie parallel to each other against the ground on one side of said mounting plates, to second positions in which said carrier poles lie parallel to each other against the ground on the opposite side of said mounting plates;

a semi-cylindrical net one longitudinal edge of which is affixed along the ground in a substantially straight line between said distal ends of said carrier poles, when in said first positions, the other longitudinal edge of which is fixed between said distal ends of said carrier poles so that upon movement of said carrier poles from said first positions to said second positions said net is moved from a stowed position along the ground to deployment in a semi-cylinder configuration to envelope said birds and other small animals underneath said net; and propelling means for attachment to said carrier poles for selectively propelling said carrier poles between said first and second positions, said propelling means including at least one elastic cord attached to at least one of said carrier poles, said elastic cord being placed in tension, when said one of said carrier poles is in said first position biasing said one of said carrier poles toward said second position; said propelling means also including lofting means engageable with said elastic cord, when said one of said carrier poles is in said first position, so that the portion of said elastic cord near said one of said carrier poles is inclined, relative to the ground, placing a vertical force component on said carrier pole for initiating movement thereof from said first to said second position.

2. The capturing apparatus of claim 1 in which said propelling means comprises first and second elastic cords attached to said first and second mounting plates and said first and second carrier poles, respectively, said first and second elastic cords being placed in tension when said carrier poles are in said first positions biasing said carrier poles toward said second positions.

3. The capturing apparatus of claim 2 in which said lofting means includes a lofting pin attached to each of said mounting plates and engageable with respective ones of said elastic cords, when said carrier poles are in said first positions, so that the portion of said elastic cords nearest said carrier poles are inclined relative to the ground placing a vertical force component on said carrier poles for initiating movement thereof from said first to said second positions.

4. The capturing apparatus of claim 3 including retainer means carried by said mounting plates and cooperable with said carrier poles when in said first positions, to prevent movement thereof to said second positions, said retainer means being remotely operable to release said carrier poles for movement to said second positions.

5. The capturing apparatus of claim 4 in which said retainer means includes a release member biased into engagement with a slot and operating means engageable with said release member and remotely operable to overcome said bias releasing said release member from said slot.

* * * * *